United States Patent [19]

Sato et al.

[11] Patent Number: 4,840,265

[45] Date of Patent: Jun. 20, 1989

[54] OBJECT DISTRIBUTING AND SUPPLYING METHOD AND APPARATUS

[75] Inventors: Yasuhiro Sato; Kazuo Haraguchi, both of Shizuoka, Japan

[73] Assignee: Kabushiki Kaisha Maki Seisakusho, Shizuoka, Japan

[21] Appl. No.: 86,711

[22] Filed: Aug. 18, 1987

[30] Foreign Application Priority Data

Aug. 29, 1986 [JP] Japan .................. 61-202822
Sep. 5, 1986 [JP] Japan ............... 61-136492[U]
Sep. 16, 1986 [JP] Japan ............... 61-141554[U]

[51] Int. Cl.⁴ .......................................... B65G 47/26
[52] U.S. Cl. ..................... 198/446; 198/458; 198/699.1; 198/822; 198/831
[58] Field of Search ............ 198/445, 446, 458, 699.1, 198/831, 822, 851, 852

[56] References Cited

U.S. PATENT DOCUMENTS

| | | | |
|---|---|---|---|
| 2,528,114 | 10/1950 | Cerruti | 198/458 |
| 3,338,380 | 8/1967 | Grebe | 198/822 |
| 3,521,322 | 7/1970 | Michael et al. | 198/699.1 |
| 3,842,968 | 10/1974 | Owens | 198/851 |
| 4,036,355 | 7/1977 | Valli | 198/699.1 |

FOREIGN PATENT DOCUMENTS

| | | |
|---|---|---|
| 52-4821 | 2/1977 | Japan . |
| 52-12470 | 4/1977 | Japan . |
| 52-12982 | 4/1977 | Japan . |
| 53-3583 | 1/1978 | Japan . |
| 53-33986 | 8/1978 | Japan . |
| 53-33987 | 8/1978 | Japan . |
| 55-6739 | 2/1980 | Japan . |
| 55-46660 | 11/1980 | Japan . |
| 56-47147 | 5/1981 | Japan . |
| 56-38024 | 9/1981 | Japan . |
| 57-32981 | 7/1982 | Japan . |
| 57-34173 | 7/1982 | Japan . |
| 59-28972 | 8/1984 | Japan . |
| 59-28973 | 8/1984 | Japan . |

Primary Examiner—Joseph E. Valenza
Attorney, Agent, or Firm—Toren, McGeady & Associates

[57] ABSTRACT

An object distributing and supplying method, comprising a step of receiving ball-like objects supplied in a bulk from a preceding process line by a wide receiving part formed by starting end parts of a plurality of curved conveyors adjacently connected with each other, a step of distributing the objects into a plurality of separated rows in a curved line, and a step of conveying each of the rows of objects in a streamline into respective downstream apparatuses. The apparatus therefore comprises an object distributing and supplying apparatus, comprising a plurality of conveyors running curvilinearly in a predetermined direction and each conveying at least a row of ball-like objects in the running direction of the conveyors, with starting end parts of the conveyors being connected together adjacently and in parallel with each other to form a wide receiving part for receiving the objects in bulk, and the conveyors being increasingly spaced between them as they are more remote from the wide receiving part, and connected to downstream apparatuses respectively with their terminating end parts in parallel with each other, so as to distribute and supply the objects in rows to the downstream apparatuses respectively.

3 Claims, 14 Drawing Sheets

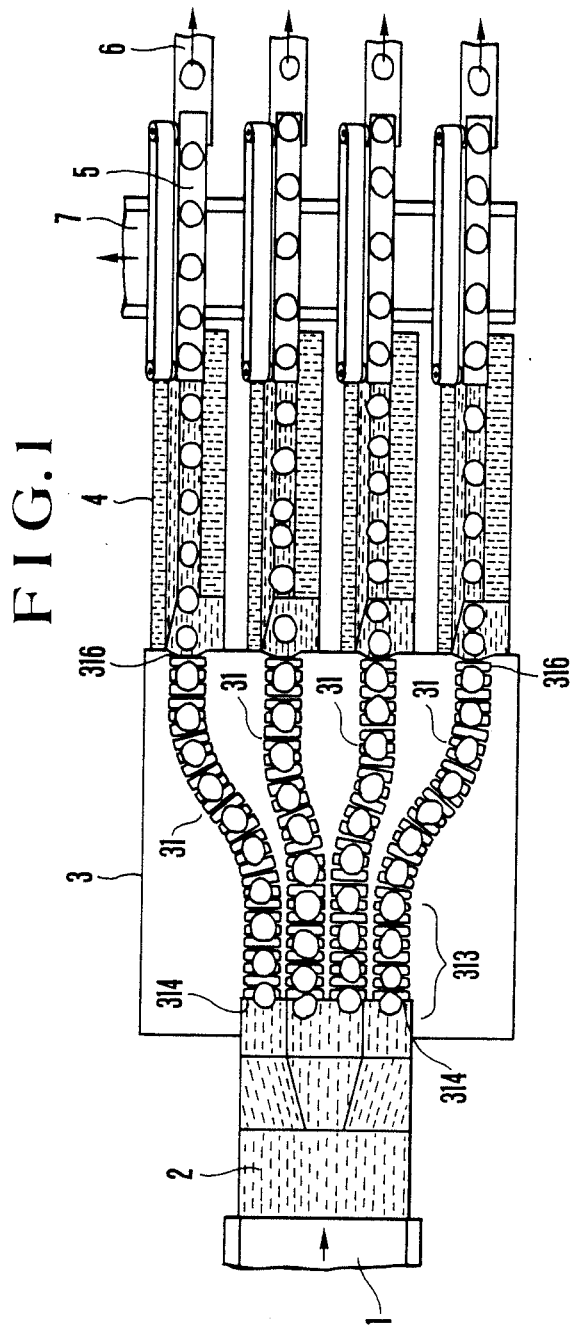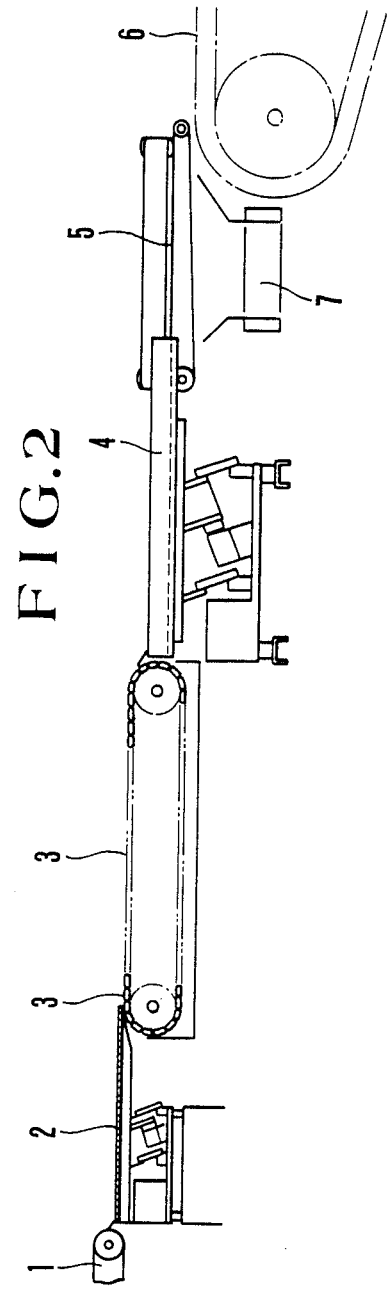

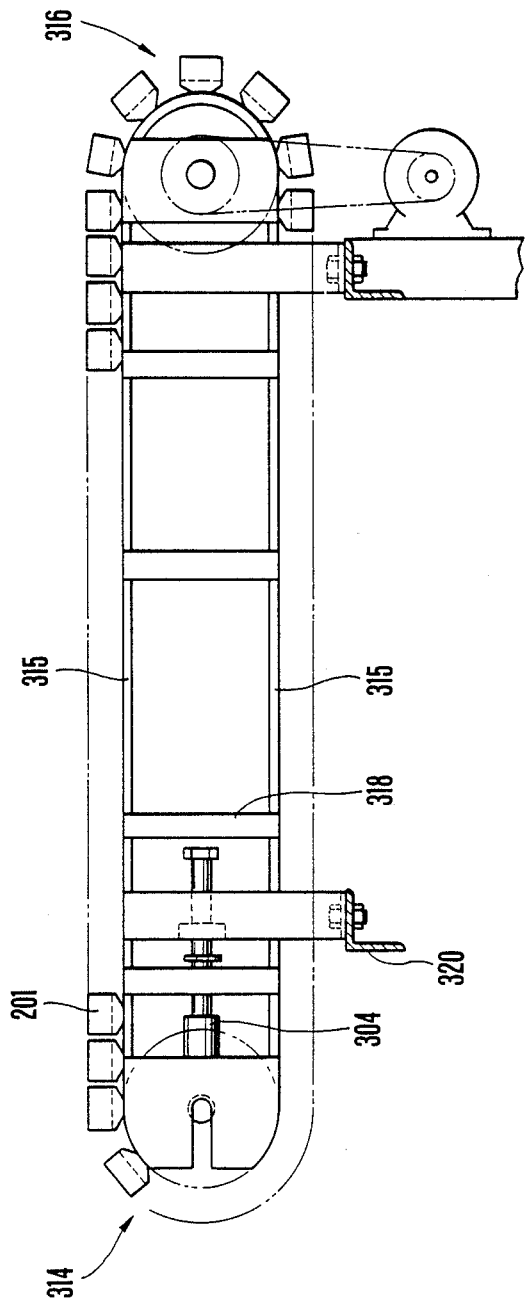

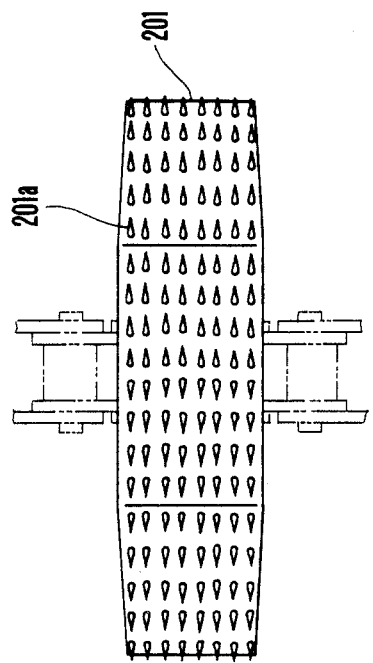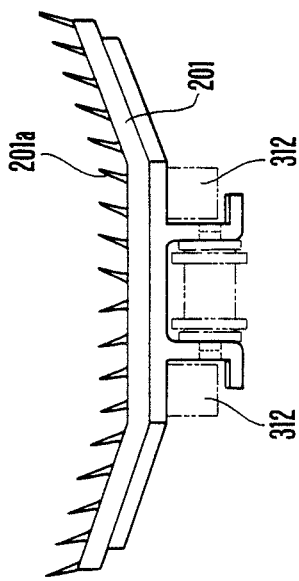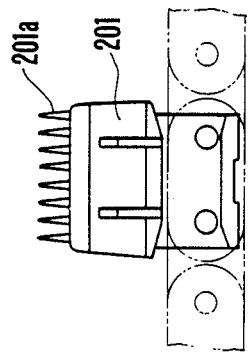

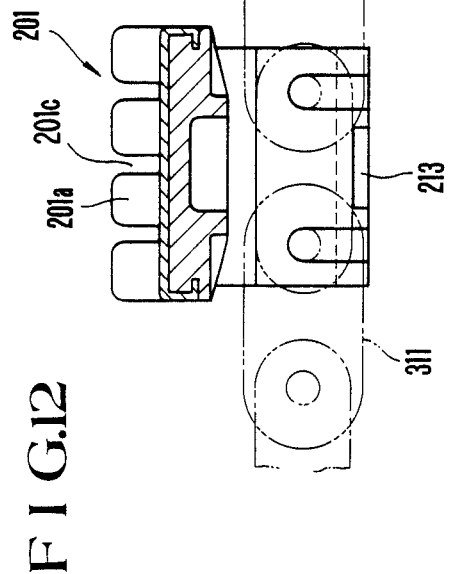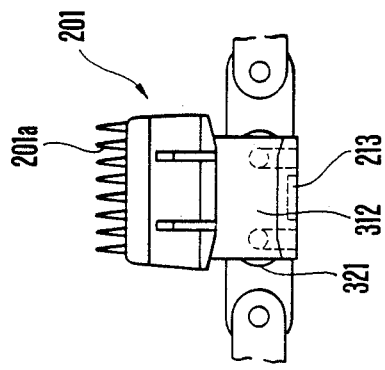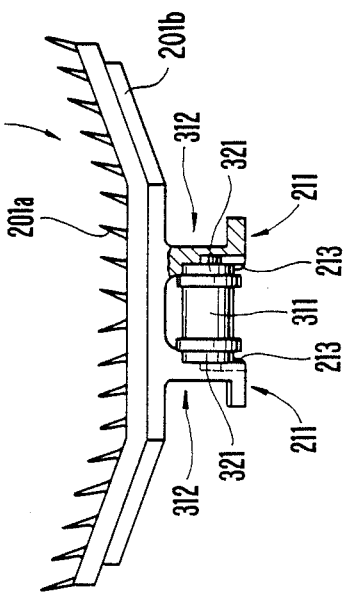

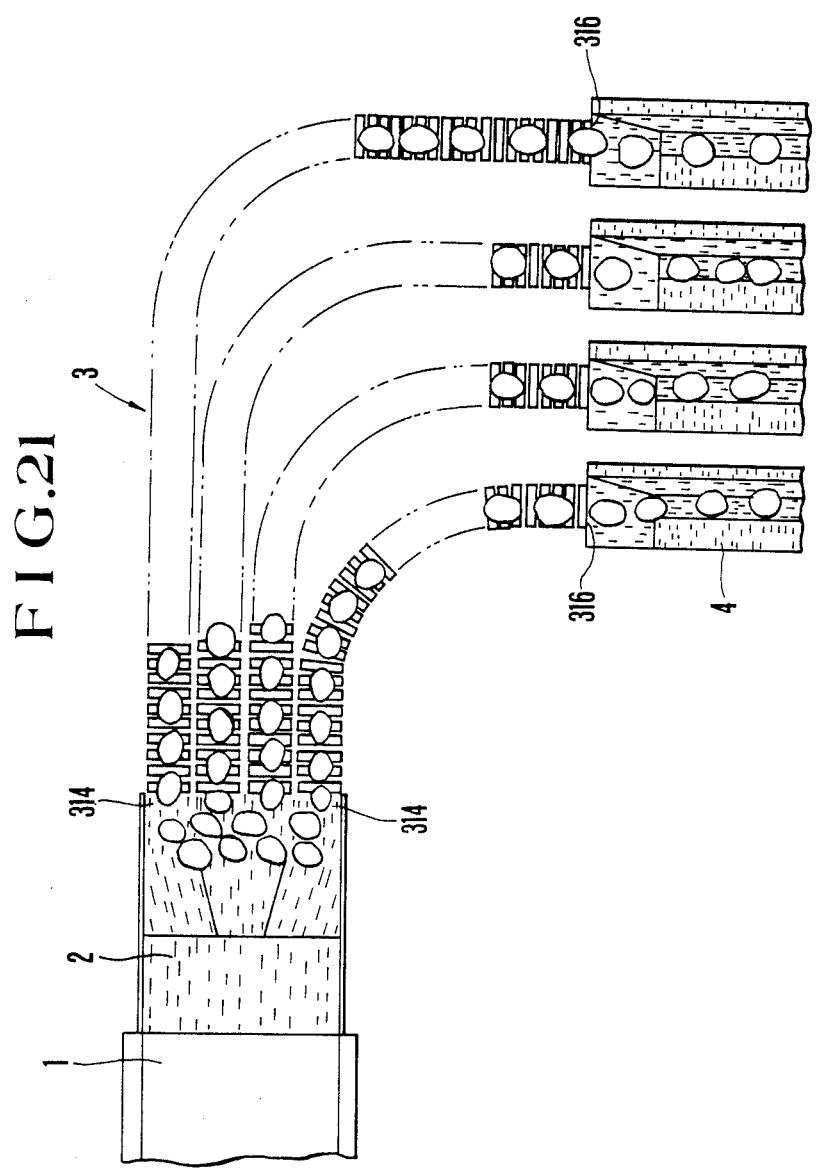

OBJECT DISTRIBUTING AND SUPPLYING METHOD AND APPARATUS

BACKGROUND OF THE INVENTION

1. Field of the Invention:

The present invention relates to an object distributing and supplying method and apparatus, particularly a method and an apparatus for distributing and conveying such ball-like objects as fruits and vegetables, which have been supplied in a large quantity and in such a random manner as including irregular spacings from each other in the transverse direction and are easy to roll, soft and susceptible to damage, from various types of conveyors to a plurality of lines, and conveying elements.

2. Description of the Related Art:

To rearrange objects supplied from the preceding process line in many rows of objects, for example, in fruit and vegetable sorting facilities, feed mechanisms have been used which comprise a divergent roller conveyor having a large width corresponding to that of the line of many sorting conveyors so as to distribute and supply the objects in uniform rows onto the sorting conveyors equally spaced between them and installed in parallel with each other (for example, as described in the Japenese Utility Model Publication No. Sho 56-47147).

However, the conventional feed mechanisms present the disadvantages that although they are designated on the assumption that objects will roll in the desired direction by the aid of their rotations in the course of their travel from the upstream line (the preceding process line) to the downstream apparatuses (hereinafter referred to as "connection conveyors"), the objects may not be uniformly distributed onto three or more connection conveyors due to their different forms and sizes which do not cause the objects to roll properly in the desired direction, but in random directions, and that much more objects may be distributed (conveyed) onto the connection conveyors in the central part of the conveying line than those on the right and left sides of the line.

These feed mechanisms present also the disadvantages that the rows of objects supplied from the preceding process line may be out of alignment, and that according to the feed direction, for example, by supplying objects from the side of each conveyor, the leftmost or rightmost connection conveyor may be overflowing with objects, while the other connection conveyors are short of objects, that is, many connection conveyors may be divided in densely-loaded conveyors and scarcely-loaded conveyors.

In short, they present the demerit that the densely loaded sorting conveyors cannot sort objects, while the scarcely loaded conveyors can sort objects, but result in a reduced quantity of processed (or sorted) objects and thus in a deteriorated performance of the conveyors.

On the other hand, other techniques are publicly known which can divide (or rearrange) objects forcedly in rows by using scrapers or guide rails on conveying apparatuses such as top plate chain conveyors. However, these techniques have not be used, practically, because agricultural products such as fruits and vegetables have soft skins subject to damage, scratching or crushing.

In these circumstances, a method and an apparatus for distributing and supplying objects have been desired which can distribute objects continuously from the preceding process line to the specified downstream positions through a conveying path which is continuously diverged in a plurality of conveying branches connected to the downstream positions.

Conventionally, top plate chain conveyors using flat plates or top plates as conveying elements have been used to carry objects such as bottles and cans.

However, the conventional top plate chain conveyors, which comprise a flat plate of metal or resin, and guide rails at both sides of the conveying path on which the top plate runs, are suitable to convey the regularly-formed objects such as glass bottles and metallic cans which have flat bottoms and constant sizes as well as relatively hard surfaces not subject to damage in contact with the side guide rails, while they are not practically applicable to convey the objects such as ball like fruits and vegetables which are soft in surface, liable to roll out and different in size, because these objects are unstable on the conveying elements, apt to be rolled and damaged during transportation, and subject to damage in contact with the side rails.

In addition, the top plate chain conveyors cannot be supported on their return sides where the chain conveyors are turned over with the top surfaces of the top plates sliding over the return rails.

As the results, the top plate chain conveyors present the demerit that the top surface of the conveying elements may be stained with dust and oil on the return rails.

SUMMARY OF THE INVENTION

The main object of the present invention is to provide a method and an apparatus which can eliminate various disadvantages presented by the conventional feed mechanisms and which can distribute and supply such ball-like objects as fruits and vegetables which are easy to roll, soft and are susceptible to damage in uniform rows and in a streamline onto the connection conveyors equally spaced and installed in parallel with each other in the downstream process line, in whatever conditions the objects are supplied in such a random manner as including irregular spacings from each other in the transverse direction from the preceding process line.

Another object of the present invention is to provide a conveying method and apparatus which can carry such ball-like objects as fruits and vegetables which are easy to roll, soft and are susceptible to damage, without rolling them on curved paths.

Another object of the present invention is to provide conveying elements which permit to carry the above mentioned ball-like objects, irregular in form and sizes, in the stable conditions without rolling them, and which can carry the objects without damaging them.

DETAILED DESCRIPTION OF THE INVENTION

The present invention relates to means for distributing and supplying a number of objects, vulnerable to damage and easy to roll, and supplied at random from the preceding process line, continuously onto many downstream apparatuses (or connection conveyors) equally spaced from each other and installed in parallel with each other.

The most preferred means for rearranging a number of objects supplied at such random manner as including irregular spacings from each other in the transverse direction in the predetermined number of rows may be constructed so that the conveying apparatus receives objects at its wide receiving part comprising starting straight portions of a predetermined number of narrow curved conveyors arranged side by side adjacent to each other, and the curved conveyors each conveyors the objects thereon gradually diverge and are increasingly spaced from each other toward a downstream apparatus to connect directly to the downstream apparatus in almost straight line form so as to supply the objects to the downstream apparatus.

Particularly, the conveying apparatus comprises the predetermined number of curved conveyors which have respectively a narrow conveying surface on which almost one row of ball-like objects is carried in the direction of their travel, and which are equipped with conveying elements in a special form to make the conveyors divergently curved. The starting end parts of the curved conveyors are connected adjacently and traversely with each other to form a wider aprt of the conveying surface as the receiving part thereof, where the conveying elements of the conveyors are arranged in parallel rows at such random manner as including irregular spacings from each other in the transverse direction in the predetermined along the predetermined distance (or length).

Each one of the conveying elements in these conveyors has a number of fin-shaped flexible and elastic projections which extend in the running direction (direction of travel of the conveyor) from the front end to the rear end of the element and at the same time disposed at an upper part of the element and in parallel with almost equal spaces from each other in the transverse direction (left and right direction), thus forming a carrying surface to place the ball-like object thereon, and this carrying surface of the conveying element is so formed as gradually inclining downwards from respective left and right edges towards an almost flat central part in such extent that the ball-like object rolls thereon. Further a pluality of notches are provided with equal spacings in the running direction at the upper portion of each one of the fin-shaped flexible projections for preventing the ball-like object from rolling in the running direction.

The preceding process line which supplies objects to the receiving part of the conveying apparatus is preferably formed by using a conveying apparatus as wide as the receiving part, and so connected to the receiving part that objects can be in such a random manner as including irregular spacing from each other in the transverse direction supplied from the preceding process line onto the receiving part.

The curved conveyors have the spacing more widened out divergently and curvedly as it is more distant from the receiving part, to form a row of conveying paths with the predetermined spacing between each other.

With the above structural arrangements, a great number of vulnerable and easy-to-roll soft objects supplied from the preceding process line in such random manner as including irregular spaces from each other in the trans verse direction, are carried on the central parts of the carrying of the individual narrow conveyor elements and diverged into a predetermined number of strips of flow and transferred into the subsequent process line so that the objects will not roll in the left and right direction and in the running direction during the branching off and conveyance of the onjects and at the same time the objects are not subjected to forced rolling, contact, and friction caused by the apparatus (such as by scrapers and side rails) and are distributed and supplied equally in the predetermined number of strips of flow.

The terminating end parts of the spaced and curved conveyors are connected directly to the next process line (for example, sorting conveyors) in parallel with each other in the running direction.

The curved conveyors may be individually driven by the corresponding motors. However, it is preferable that they are driven in interlock by a motor through an intermediate shaft. Alternatively, any other desired driving method may be employed.

The curved conveyors may comprise any of various chains, or preferably a chain such as the known Side Bow Roller Chain (the brand name of chains by Yamahisa) or Curved Chain (the brand name of chains by Tsubakimoto), which has the same principal sizes as the JIS roller chains as well as a flexibility and side bends (in the form of an arc) with a special clearance between links, and conveying elements according to the present invention.

Each of the conveying elements has a conveying surface which has a central concave part and two right and left convex side parts, and two guide support parts which extend vertically down from the conveying surface of the element and are folded outward at the lower ends respectively so that a pin link of the chain can be fitted between the guide support parts.

Two guide rails are fitted in the spaces defined by the right and left concave guide support parts of the conveying elements respectively so that the guide% rails support the conveying elements horizontally and that the concave guide support parts of the conveying elements are slided on the guide rails.

The guide rails form a moderately curved conveying path extending from the starting end parts to the terminating end aprts of the conveyors respectively.

Therefore, the narrow conveying elements are arranged so that they can be run along the curved conveying path formed by the guide rails.

The guide rails are formed by simple round or square bar members so that they can be formed very easily in the desired curved lines.

The combined mechanism of the chain and the conveying elements may be constructed by any assembling method, for example, using rivets and screws, elastic fasteners of plastic material, or any bonding agent.

Since each conveying element has two guide support parts on both lower sides of the elements as described above, the conveying elements of the conveyor according to the present invention are reversely hung by the guide rails with the carrying surface not in contact with the conveyor frames nor the guide rails, while they are running on the return side (or lower return way) of the conveyor.

Therefore, the carrying surfaces of the conveying elements may be formed with a number of fin-shaped flexible and elastic projections for conveying the soft and easy-to-roll articles in a stable manner.

A conveyor frame is constructed by four guide rails or two upper rails and two lower rails, connected with each other at several points and combined with the guide support parts of the conveying elements.

In the present invention, conveying elements of a plurality of the curved conveyors are adjacent to each other at the receiving part and at the same time each one of the conveying elements has a number of fin-shaped flexible and elastic projections which extend at its upper surface in the running direction from its front end to the rear end and at the same time are arrayed in parallel with almost equal spaces from each other in the transverse direction, and each carrying surface formed by these fin-shaped projections is so formed as gradually inclining downwards respectively from its left and right edges towards its almost flat center part in such an extent that the ball-like object rolls thereon, further a plurality of notches with a suitable shape are provided at the upper part of each one of the fin-shaped flexible and elastic projections with almost equal spacings in the running direction, as the means that such ball-like objects as fruits and vegetables which are supplied from a preceding process line in a large quantity and in such random manner as including irregular spacings from each other in the transverse direction can be received softly at the receiving part and placed in a stable manner on central parts of the carrying surfaces of the conveying elements and can be conveyed without rolling the objects during a conveyance.

Therefore, in the present invention, each one of the carrying surfaces formed by a number of fin-shaped flexible and elastic projections is adjacent laterally to each other at the receiving part and at the same time is gradually sloped downwards respectively from its both left and right edges towards its almost flat central part in such extent that the ball-like object rolls thereon, thus even if the ball-like objects which have been supplied to the receiving part from a preceding process line with irregular spaces in the transverse direction are supplied onto either left or right side portions or to either left or right edge of the carrying surfaces of the conveying elements, the ball-like objects can be received softly and can be guided to and placed on the central part of the carrying surface in a stable manner, also as each one of the number of projections of each conveying element is fin-shaped and extends in the running direction from the front end to the rear end of the conveying element and at the same time are arrayed with almost equal spacings from each other in the transverse direction, the ball-like objects guided to the central part of the carrying surfaces can be prevented from rolling in left and right direction or in oblique directions during the conveyance. Moreover, since a plurality of notches are provided at the upper part of each one of the fin-shaped projections with almost equal spaces in the running direction, the ball-like objects can be prevented from rolling in the running directions. As the ball-like objects will not roll during the conveyance in any directions in the present inventin, soft and susceptible-to-damage ball-like objects will not be damaged.

BRIEF EXPLANATION OF THE DRAWINGS:

FIG. 1 is a plan view schematically showing the process and apparatus arrangement according to the present invention.

FIG. 2 is a side view of FIG. 1.

FIG. 7 is a side view of FIG. 6.

FIG. 9(a), 9(b) and 9(c) are respectively a plan view, a cross sectional view and a side view of the conveying element having needl-like projections on the conveying surfaces.

FIGS. 10 through 18 show the combinations of the conveying element with the chain element.

FIG. 21 schematically shows another embodiment of the process and apparatus arrangement according to the present invention.

DETAILED DESCRIPTION OF THE PREFERRED EMBODIMENTS

Figure 3:
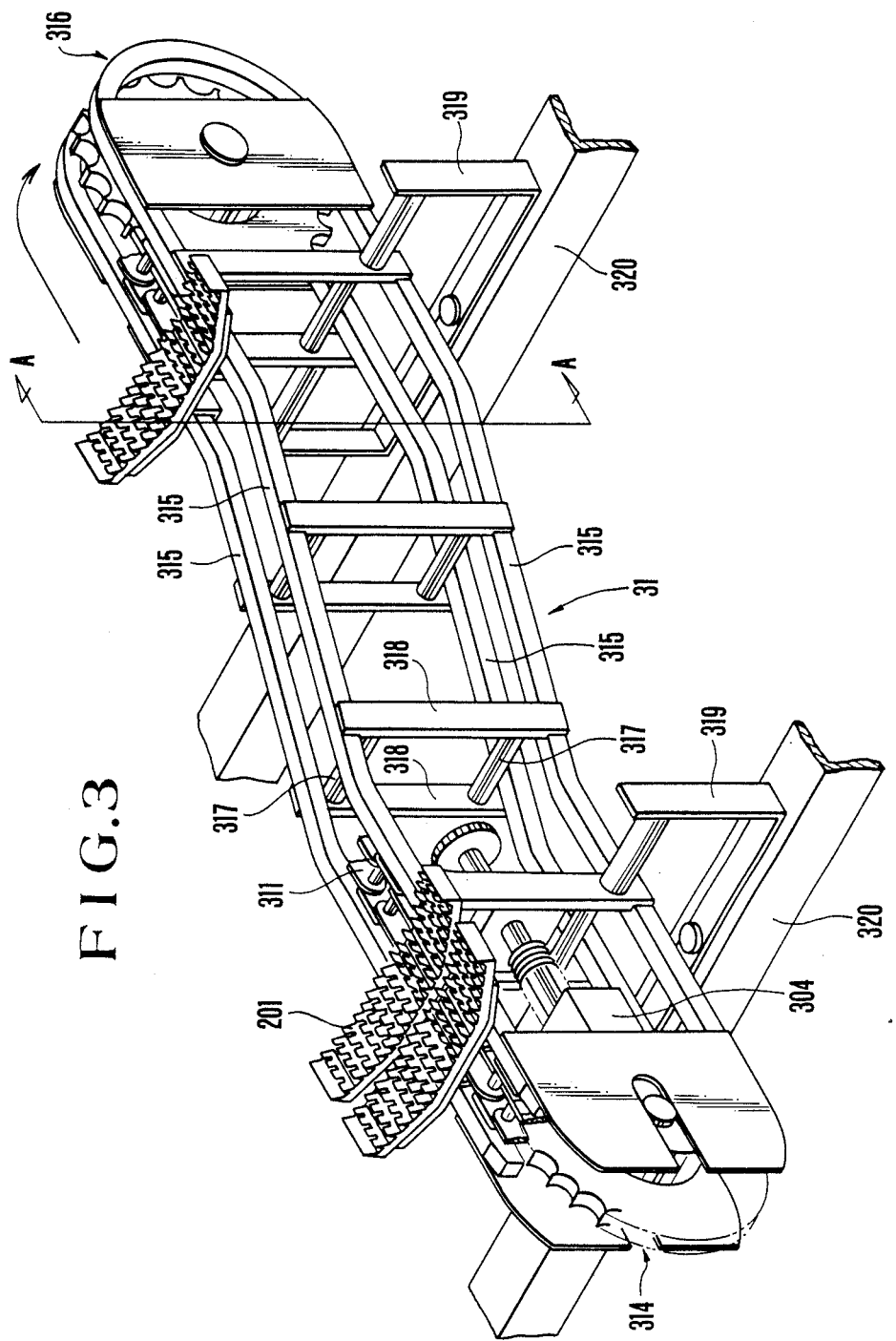
FIG. 3 is a perspective view showing the curved conveyor according to the present invention.

The preferred embodiments of the present invention will be described in reference to the drawings annexed hereto.

FIGS. 1 and 2 illustrate a preferred embodiment of the present invention together with the downstream and upstream apparatuses as required.

1 is a feed conveyor on the preceding process line. 2 is a feeder, 3 is a distributing and supplying apparatus according to the present invention, and 4 is an arraying apparatus which conveys the distributed and supplied objects which are easy to roll, soft and susceptible to damage such as fruits and vegetables on arraying and positioning them and adjusting their orientation. 5 is a set of conveyors, 6 is a set of connection conveyors, and 7 is an overflow conveyor which discharge the objects overflowing the arraying apparatus 4.

It is preferable that the conveying path of the feed conveyor 1 on the preceding process line is as wide as the receiving inlet part of the distributing and supplying apparatus 3, the width of which depends upon the number of rows in which the supplied objects are divided, and that if the conveying path of the feed conveyor 1 is narrower or wider, a feeder 2 is installed between the feed conveyor 1 and the distributing and supplying apparatus 3 to adjust the difference of width between them.

The feeder 2 may be also used to spread out the superposed objects supplied from the feed conveyor 1 and supply the objects in a layer to the inlet of the distributing and supplying apparatus 3.

If the conveying path of the feed conveyor 1 is as wide as the receiving part of the distributing and supplying apparatus 3 and if objects are scattered in a layer on the feed conveyor 1, the feeder 2 may be removed.

The distributing and supplying apparatus 3 according to the present invention comprises a number of curved conveyors 31 of narrow width corresponding to the number of connection conveyors 6 (four conveyors in this embodiment on the next process line, as shown in FIGS. 1 to 7). Each one of the curved conveyors 31 has one chain 311, to which a number of conveying elements 201 with a special shape and a narrow width are provided with equal spaces therebetween in the direction of travel of the chain 311.

The receiving part 313 of the distributing and supplying apparatus 3 is composed of the starting end parts 314 of the curved conveyors 31, connected together adjacently and in parallel with each other along a certain length so as to form a wide conveying surface. Therefore, the conveying elements 201 of the curved conveyors 31 are adjacent to each other in the tranverse direction and are parallel with each other at the receiving part 313.

The receiving part 313 is along enough to stabilize the positions of rollable objects transferred in such random manner as including irregular spacings in the transverse direction from the preceding process line into the receiving part 313.

The terminating end parts 316 of the curved conveyors 31 are installed in parallel with each other in the running direction, and connected to the arraying apparatus 4, which is connected in turn straightforward to the next process line.

The curved conveyors 31 will be described in detail below: The curved conveyor 31 comprises a chain 311, preferably a known chain, having a flexibility and side bends, and conveying elements 201. Each of the conveying elements 201 has a base part 201b, and has two guide support parts 312 which extend vertically downward from the base part 201b of the element 201 and are folded outward at the lower ends respectively so that a pin link 311a of the chain 311 can be fitted between the guide support parts 312 of the conveying element 201.

Guide rails 315 are installed in combination with the guide support parts 312 of the conveying elements 201 so that the chain 311 and the conveying elements 201 of a curved conveyor 31 are curvilinearly run.

The guide rails 315 extend from the starting end part 314 of a curved conveyor 31 to the predetermined position in the terminating end part 316 of the curved conveyor 31 to form a moderately-curved conveying path of the curved conveyor 31.

The guide rails 315 are installed symmetrically on the upper or conveying path side and the lower or return side of the curved conveyor 31. Therefore, the conveying elements 201 on the return side of the conveyor 31 are hung by the guide support parts 312 of the conveying elements 201 while they are running.

The conveying paths of the curved conveyors 31 may be installed radially and divergently from the starting end parts 314 to the terminating end parts 316 of the conveyors 31 respectively, as shown in FIG. 1, or othewise they may be bent to the right (as shown) or left in their courses, as shown in FIG. 21 illustrating another embodiment of the present invention.

Alternatively, the conveying paths may be installed in the combination of the configurations as shown in FIGS. 1 and 21.

Figure 4:
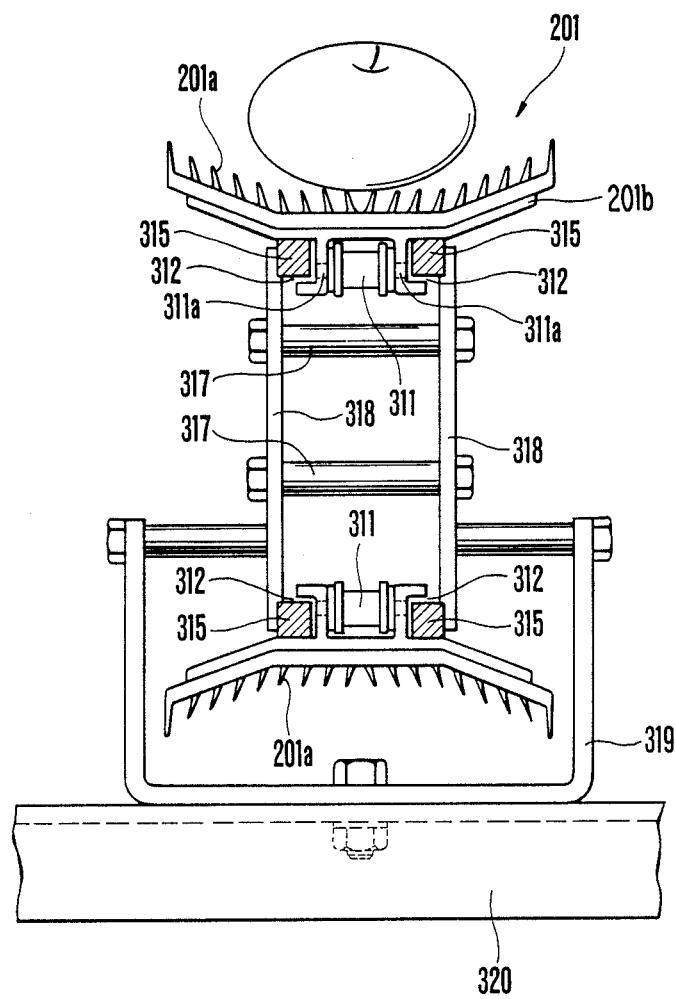
FIG. 4 is a cross-sectional view along A—A in FIG. 3.
Figure 5:
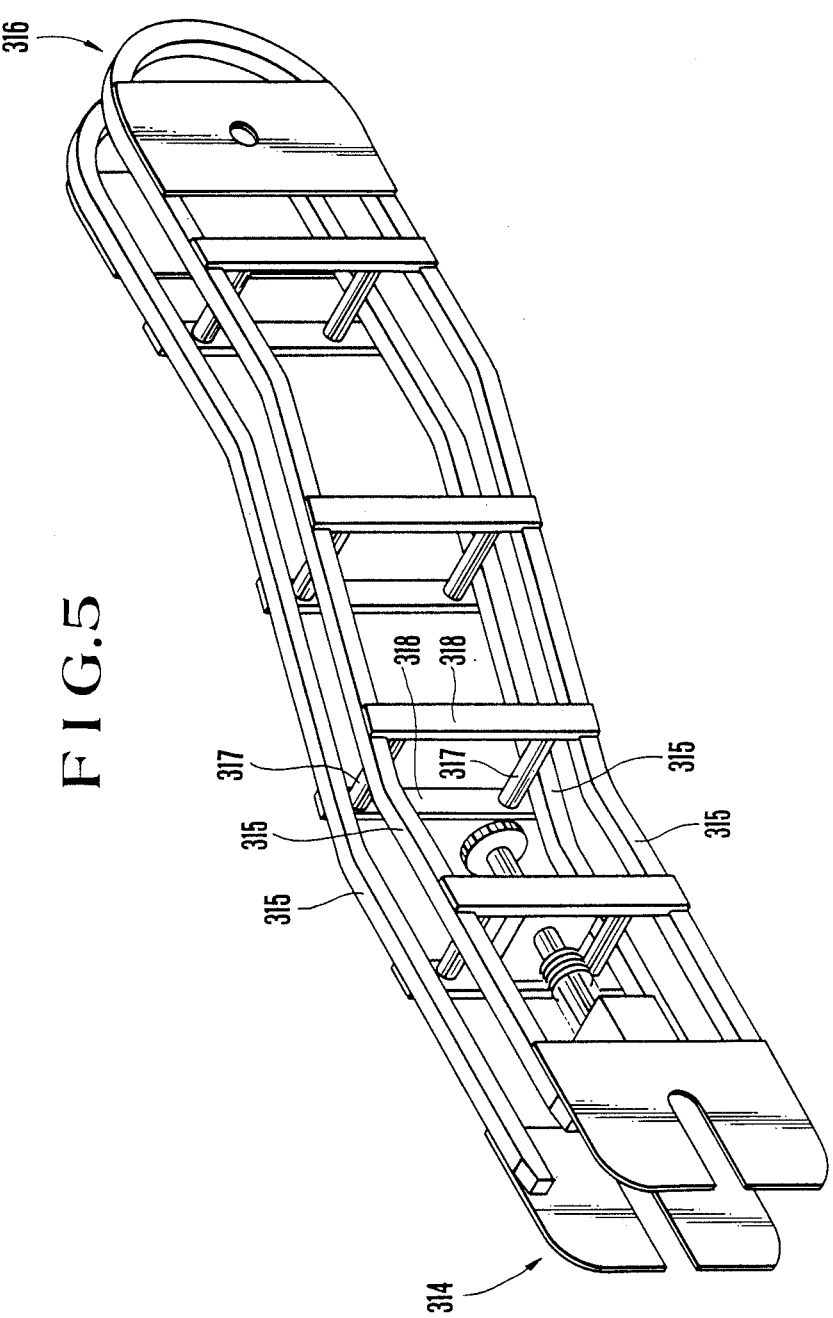
FIG. 5 is a perspective view of the frame structure of the curved conveyor.
Figure 6:
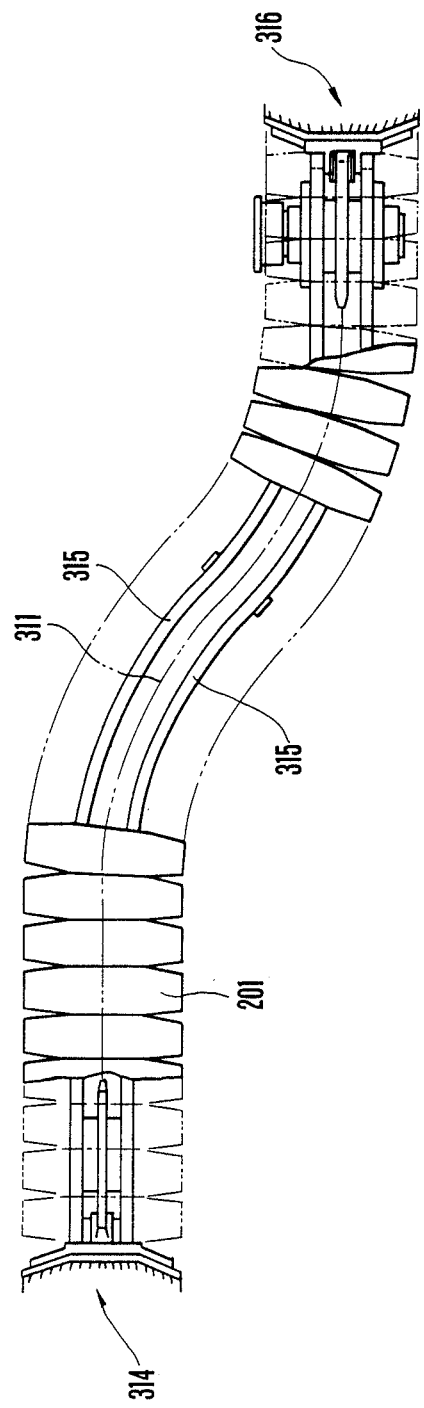
FIG. 6 is a plan view of another embodiment of the curved conveyor according to the present invention.

The width setting members 317 as shown in FIGS. 3, 4 and 5 are installed so that the horizontal distance between two upper or lower guide rails 315 is constant.

The connecting members 318 as shown in the figures vertically fix the guide rails 315 on the conveying side and return side of the conveyor 31. The frame of the curved conveyor 31 is formed by the curved guide rails 315 as well as the width setting members 317 and the connecting members 318 mounted on the guide rails 315 at several points. The frame of the curved conveyor 31 is fixed on the bases 320 with fixing fittings 319.

Therefore, the guide rails 315 of this conveyor 31 serve as both the frame and the chain rails, which it is not required to install separately. 304 is a chain tension device installed in the starting end part 314 of the conveyor 31.

The curved conveyors 31 may be individually driven by motors (not shown), or otherwise driven by a motor in interlock through an intermediate shaft (not shown).

Thus, the curved conveyors 31 receive together the soft and rollable objects supplied manner as including irregular spacings in the transverse direction from the preceding process line, divide them in rows, and convey them on the moderately curved paths respectively to the predetermined downstream position by widening out the spacing between the rows of objects.

FIG. 8, FIGS. 10 to 13 and FIGS. 15 to 18 show several embodiments of conveying element according to the present invention.

Each one of the conveying elements 201 has a number of fin-shaped flexible and elastic projections 201a, which extend from the front end to the rear end of the element 201 and at the same time are arrayed in parallel with almost equal spaces from each other in the transerve direction (left and right direction), provided at the upper part of the element 201, and a carrying surface for placing the ball-like object thereon is formed with those number of fin-shaped flexible and elastic projections 201a. Each one of the carrying surfaces is so formed as gradually inclining downwards from its both left and right edges respectively towards the its almost flat central part in such extent that the ball-like object rolls thereon. Each one of the fin-shaped projections 201a is formed with such synthetic resin as plasticized PVC, etc. having flexibility and elasticity, and a plurality of notches 201c with such suitable shapes as rectangular, inverse-trapezoidal, etc., are provided at the upper part of each one of the fin-shaped projections 201a with almost equal spaces in the running direction.

Figure 8C:
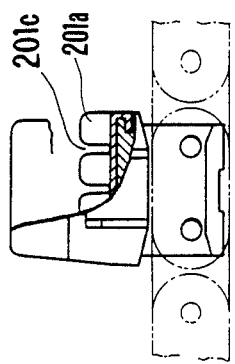
FIG. 8(a), 8(b) and 8(c) are respectively a plan view, a cross-sectional view and a side view of the conveying element having fin-like projections.
Figure 8A:
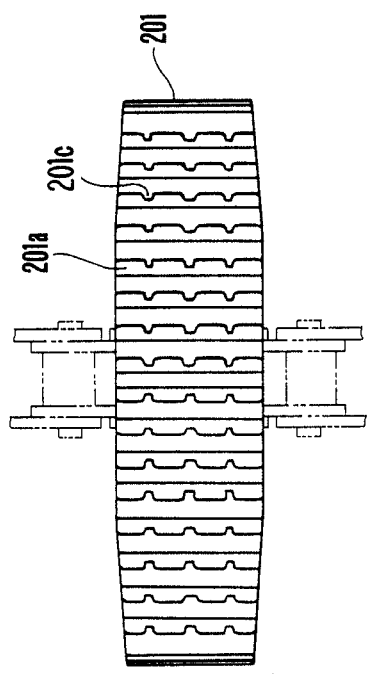
Figure 8B:
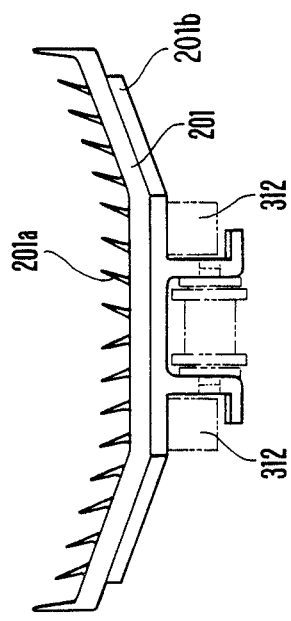

Therefore, in the present invention, even if the ball-like objects supplied from the feeder 2 (or the feed conveyor 1) to the receiving part 313 with irregular spacings in the transverse direction are supplied onto the left or right side parts or on the left or right edge of the carrying surface of the conveying element 201, such ball-like objects can be received softly and guided to and placed on the central part of the carrying surface by the above mentioned shape of the carrying surface and the shape of the projections 201a, also, the ball-like objects guided onto the central part of the carrying surface can be prevented from rolling during the conveyance in left and right direction and in oblique directions by the above mentioned fin-like shape and parallel arrangement of the number of projections 201a, and moreover, the ball-like objects can be prevented from rolling in the running direction by the above mentioned plurality of notches 201c of the projections 201a, FIGS. 3, 8 and 12 show projections 201a like fins and FIGS. 9 and 14 shows projections like needles or rods.

The chain 311 is generally known and has side bends and a flexibility.

Figure 10:
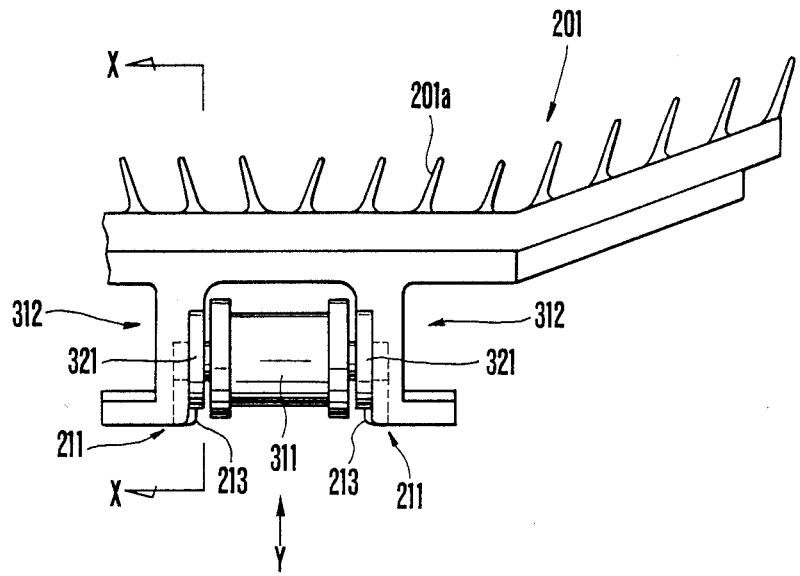
Figure 11:
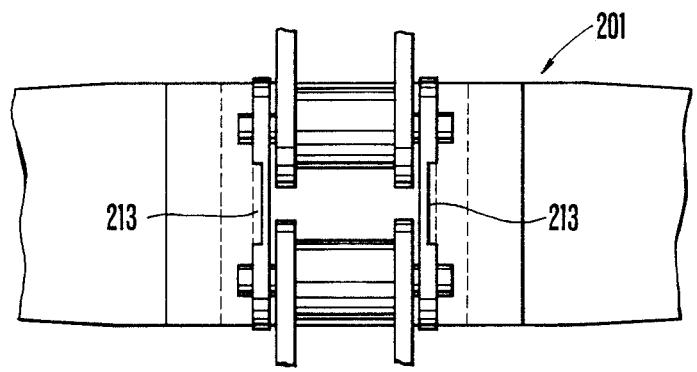

FIGS. 10 to 12 show the assembly of a conveying element 201 and the chain 311. The chain mounting part of the conveying element 201 is designed so that the link plates 321 of the chain 311 are fitted between the lower parts of the conveying element 201. The chain mounting part of the conveying element 201 is formed by two guide support parts 312 which extend vertically downward from the base part 201b of the element 201 and are folded outward at their lower end parts 211 respectively.

The lower end parts 211 of the guide support parts 312 are provided with pawls 213 mounted inside to fix the link plates 321 respectively. These pawls 213 are elastically engaged with the link plates 321 of the chain 311 respectively, after the link plates 321 have been forcedly fitted between the guide support parts 312 of the conveying element 201.

The chain 311 may be fitted in the conveying elements 201 by using screws or rivets.

Figure 19:
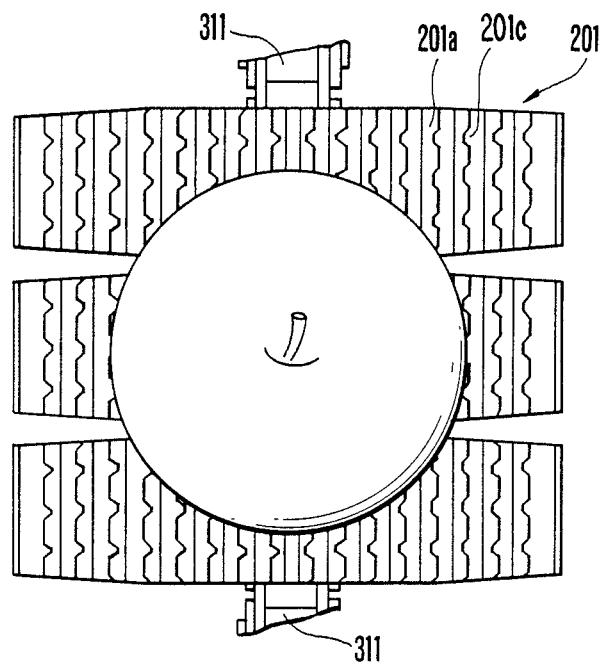
FIGS. 19 and 20 show the position of the object on the conveying element.
Figure 20:
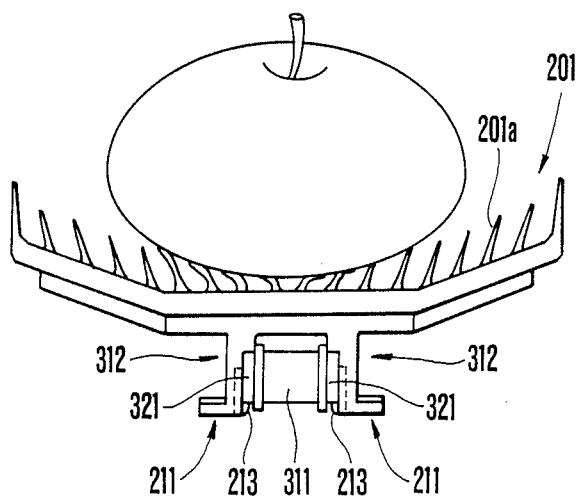

FIGS. 19 and 20 show a object ball-like resting on the carrying surfaces of the conveying element 201. The soft projections 201a are flexed by the weight of the object and serve as a cushion to rest the object stably.

The guide rails 315 are fitted in the laterally concave guide support parts 312 of the conveying element 201 respectively to support the conveying element 201 horizontally. These guide rails 315 form a moderately curved conveying path extending from the starting end part 314 to the temrinating end part 316 of the curved conveyor 31 so that the guide support parts 312 of the conveying elements 201 are sliding along the conveying path.

The upper and lower pairs of guide rails 315 are symmetrically installed, the lower or return side of which hangs the running conveying elements 201 at their guide support parts 312 so that the projections 201a of the conveying elements 201 are not in contact with the guide rails 315.

Figure 15:
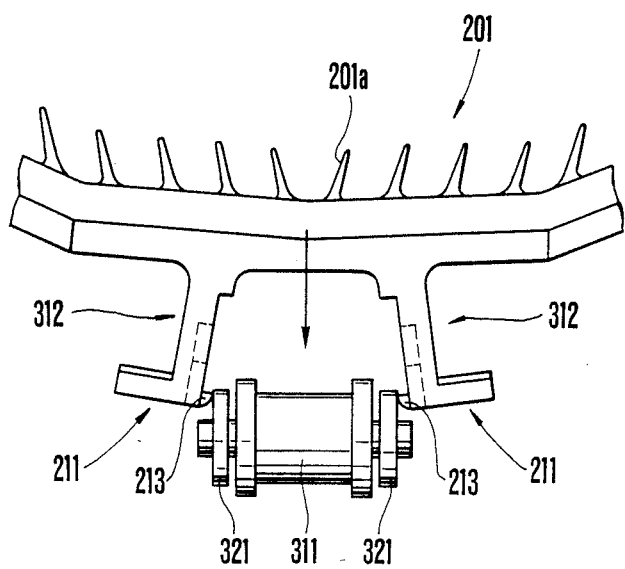

FIG. 15 shows the mounting of the conveying element 201 on the chain 311.

Figure 16:
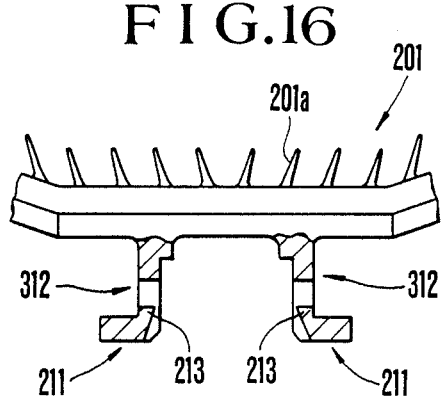
Figure 17:
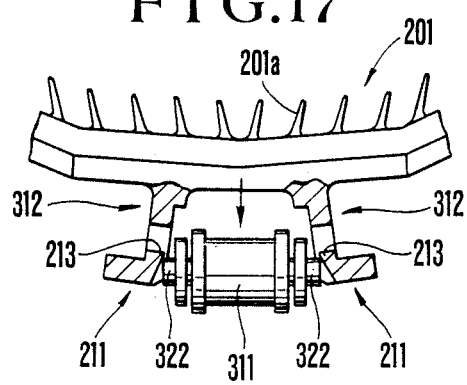
Figure 18:
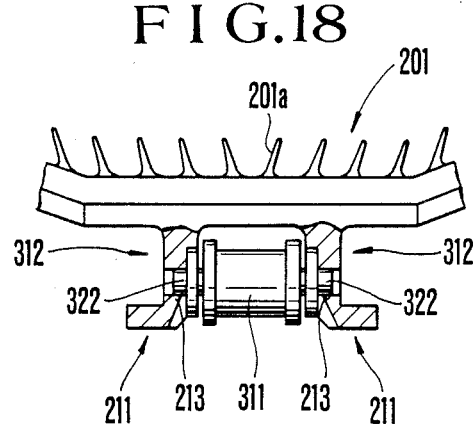

FIGS. 16 to 18 show another embodiment of the method for mounting the conveying element 201 on the chain 311.

The pawls 213 are elastically engaged with the connecting pins 322 of the chain 311 respectively.

The conveyor 31 thus constructed runs curvilinearly or linearly and carries soft and rollable ball-like objects resting softly and stably on the projections 201a of the conveying elements 201 to the next process line.

The description given above and the drawings annexed hereto relate to preferred embodiments of the present invention. The present invention is not limited to the embodiments, but applicable to any other method and apparatus without deviating from the scope and spirit of the present invention.

The present invention is to receive such ball-like objects as fruits and vegetables which are supplied from a preceding process line in such a random manner as including irregular spacings therebetween in the transverse direction and are easy to roll, soft and susceptible to damages at a receiving part with a wide width formed by starting end parts of a plurality of curved conveyors being adjacent to each other, wherein the spaces between the conveyors gradually expand as they are remote from that receiving part to a down-stream portion for distributing and supplying the ball-like objects in one row to a down-stream apparatus to which the above mentioned plurality of conveyors are respectively connected at their terminating end parts, and at the receiving part of the present invention respective conveying elements of the plurality of curved conveyors are adjacent to each other and at the same time the carrying surface of the conveying elements are formed with a number of fin-shaped flexible and elastic projections is gradually down-sloped respectively from both left and right edges of the surface towards its almost flat central part in such extent that the ball-like objects roll, therefore, even when the ball-like objects are supplied from a preceding process line to the receiving part with irregular spacings in the traverse direction, not only the ball-like objects supplied on the down sloped left or right side aprt of the carrying surface of the conveying element but also the ball-like objects supplied onto the left or right edges of the carrying surface of the conveying elements can be gently guided onto the central part of the conveying elements and can be placed in a stable manner in one row on each conveyor, further, in each conveying element, the above mentioned number of fin-shaped flexible and elastic projections extend from the front end to the rear end of the element and at the same time are arrayed in parallel with almost equal spacings from each other in the transverse direction, also a plurality of notches are provided at an upper part of each one of the fin-shaped flexible and elastic projections with almost equal spacings therebetween in the running direction, therefore, the ball-like objects can be conveyed without rolling in anyone of the left and right directions or the running directions also without damaging the ball-like objects which are easy to roll, soft and susceptible to damage.

What is claimed is:

1. A method of distributing and conveying ball-like objects which are easy to roll and are soft and susceptible to damage, such as fruit and vegetables, in a generally horizontal running direction, to apparatus spaced downstream in the running direction from the preceding process line wherein the objects are received in a random manner from the preceding process line, comprising the steps of arranging a plurality of conveyors curved in the generally horizontal running direction and extending in the running direction between the preceding process line and the apparatuses, providing each conveyor with a starting end and locating the starting ends for forming a wide receiving part common to each of the conveyors at the preceding process line, providing the conveyors with a plurality of conveying elements with an upper part and a front end and a rear end spaced apart in the running direction so that the conveying elements receive the objects, forming a carrying surface on the upper part of the conveying elements with the carrying surface having a plurality of fin-shaped flexible and elastic projections extending in the running direction and spaced approximately equidistantly apart in the direction extending transversely of the running direction, inclining the carrying surfaces inwardly transversely of the running direction to a flat central part of the carrying surface so that the objects roll on the inclined surfaces to the central part, providing notches in the thin-shaped projections for preventing the objects from rolling in the running direction, distributing the objects from the preceding process line to the wide receiving parts and then to the starting ends of the conveyors, moving the objects on the carrying surfaces of the conveying elements on the conveyors along curved conveying paths diverging from one another in the running direction from the preceding process line to the appraratuses for forming a separate row of the objects on each conveyor, and conveying each row of objects from a terminating end part of the conveyor to one of the apparatuses for movement from the terminating end in a streamline manner.

2. Apparatus for distributing and conveying ball-like objects which are easy to roll and are soft and susceptible to damage, such as fruits and vegetables, from a preceding process line in a generally horizontal running direction to apparatuses spaced downstream in the running direction from the preceding process line where the objects are received in a random manner from the preceding process line, comprising a plurality of conveyors having a generally horizontal curvilinear configuration with the conveyors having a running direction extending generally horizontally from the preceding process line to the apparatuses, each said conveyor having a starting end part adjacent the preceding process line and a terminating end part adjacent a corresponding one of the apparatuses, said starting end parts being adjacent to one another and connected together in generally parallel relation and forming a wide receiving part for receiving the objects from the preceding process line in a random manner, each of said conveyors has a plurality of conveying elements having a pair of opposite sides extending in the running direction, a front end and a rear end spaced apart in the running direction and extending between said sides, and a carrying surface extending between said side and said front and rear ends, the carrying surface is formed on an upper part of said conveying elements and is arranged to receive the obejcts and to convey the obejcts between the preceding process line and the appratuses, the carrying surfaces of each said conveyor arranged to form a row of the objects in the running direction, the upper part of carrying surface comprises a numebr of fin-shaped flexible and elastic projections extending in the running direction from the front end to the rear end with said projections disposed approximately parallel and approximately equidistantly spaced from one another between the sides of said carrying surfaces, each said carrying surface is inclined downwardly from the opposite sides to an approximately planar horizontal central part with the central part arranged to receive the objects, each of said fin-shaped flexible and elastic projections has at least one notch therein so that the notches in the carrying surfaces are spaced apart in the running direction and prevent the objects from rolling in the running direction, said conveyors being increasingly spaced apart in the running direction from the starting end parts to the terminating end aprts with the terminating end parts of said conveyors being disposed approximately parallel to one another for distributing the object travelling in a row on each of the conveyors to a corresponding apparatus located downstream from the conveyor.

3. An apparatus, as set forth in claim 2, wherein each of said conveying elements has a base part, each said conveying element has two laterally concave guide support parts extending vertically downwardly from said base part and folded outwardly at lower ends thereof, a chain fitted between the guide support parts, and two guide rails each curved corresponding to the curve of said conveyor and fitted in the corresponding concave guide support parts.

\* \* \* \* \*